(12) United States Patent
Umesh et al.

(10) Patent No.: US 11,887,126 B2
(45) Date of Patent: Jan. 30, 2024

(54) SYSTEMS AND METHODS FOR GENERATING A PROBATIONARY AUTOMATED-DECISIONING WORKFLOW IN A MACHINE LEARNING-TASK ORIENTED DIGITAL THREAT OR DIGITAL ABUSE MITIGATION SYSTEM

(71) Applicant: Sift Science, Inc., San Francisco, CA (US)

(72) Inventors: Pradhan Umesh, San Francsico, CA (US); Natasha Sehgal, San Francsico, CA (US); Chang Liu, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 18/123,158

(22) Filed: Mar. 17, 2023

(65) Prior Publication Data

US 2023/0316282 A1   Oct. 5, 2023

Related U.S. Application Data

(60) Provisional application No. 63/327,661, filed on Apr. 5, 2022.

(51) Int. Cl.
*G06Q 20/40* (2012.01)
*G06N 20/00* (2019.01)
*G06Q 20/38* (2012.01)

(52) U.S. Cl.
CPC ......... *G06Q 20/4016* (2013.01); *G06N 20/00* (2019.01); *G06Q 20/389* (2013.01)

(58) Field of Classification Search
None
See application file for complete search history.

(56) References Cited

U.S. PATENT DOCUMENTS

2022/0334946 A1\* 10/2022 Ganti .................... G06F 21/552

\* cited by examiner

*Primary Examiner* — David R Vincent
(74) *Attorney, Agent, or Firm* — Padowithz Alce; Chandler Scheitlin; Alce PLLC

(57) ABSTRACT

A machine learning-based method for accelerating a generation of automated fraud or abuse detection workflows in a digital threat mitigation platform includes identifying a plurality of distinct digital event features indicative of digital fraud; automatically deriving a plurality of distinct digital event decisioning criteria based on the plurality of distinct digital event features and a digital event data corpus associated with a target subscriber; automatically constructing a probationary automated fraud or abuse detection workflow based on the plurality of distinct digital event decisioning criteria, and deploying the probationary automated fraud or abuse detection workflow to a target digital fraud prevention environment associated with the target subscriber.

19 Claims, 5 Drawing Sheets

SYSTEMS AND METHODS FOR GENERATING A PROBATIONARY AUTOMATED-DECISIONING WORKFLOW IN A MACHINE LEARNING-TASK ORIENTED DIGITAL THREAT OR DIGITAL ABUSE MITIGATION SYSTEM

CROSS-REFERENCE TO RELATED APPLICATIONS

This application claims the benefit of U.S. Provisional Application No. 63/327,661, filed on 5 Apr. 2022, which is incorporated in its entireties by this reference.

TECHNICAL FIELD

This invention relates generally to the digital fraud and abuse field, and more specifically, to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In some embodiments, a machine learning-based method for accelerating a generation of automated fraud or abuse detection workflows in a digital threat mitigation platform includes identifying, via one or more computers, a plurality of distinct digital event features indicative of digital fraud based on an assessment of a digital event data corpus associated with a target subscriber; automatically deriving, via the one or more computers, a plurality of distinct digital event decisioning criteria based on the plurality of distinct digital event features and the digital event data corpus; automatically constructing, via the one or more computers, a probationary automated fraud or abuse detection workflow based on the plurality of distinct digital event decisioning criteria, wherein automatically constructing the probationary automated fraud or abuse detection workflow includes: (a) defining, via the one or more computers, a plurality of distinct automated digital event decisioning routes in the probationary automated fraud or abuse detection workflow, and (b) setting, via the one or more computers, a distinct route execution condition for each of the plurality of distinct automated digital event decisioning routes based on the plurality of distinct digital event decisioning criteria; and deploying, via the one or more computers, the probationary automated fraud or abuse detection workflow to a target digital fraud prevention environment of the target subscriber based on identifying efficacy metrics computed for the automated fraud or abuse detection workflow satisfy predetermined workflow performance criteria.

In some embodiments, automatically deriving the plurality of distinct digital event decisioning criteria includes: (i) training, via the one or more computers, a digital event meta machine learning model based on the digital event data corpus associated with the target subscriber, wherein the digital event meta machine learning model, once trained, comprises a plurality of distinct digital event classification paths that are configured to classify a target digital event to a distinct digital threat class of a plurality of distinct digital threat classes; (2) traversing, via the one or more computers, each of the plurality of distinct digital classification paths underlying the digital event meta machine learning model; and (3) extracting, via the one or more computers, one or more distinct digital event decisioning criteria from each of the plurality of distinct digital event classification paths based on the traversing.

In some embodiments, each of the plurality of distinct automated digital event decisioning routes defined in the probationary automated fraud or abuse detection workflow relates to a distinct digital event classification path underlying the trained digital event meta machine learning model, and the distinct route execution condition for each of the plurality of distinct automated digital event decisioning routes comprises the one or more distinct digital event decisioning criterion extracted from the distinct digital event classification path related to each of the plurality of distinct automated digital event decisioning routes.

In some embodiments, the digital event data corpus used for training the digital event meta machine learning model comprises a plurality of distinct digital event meta-training data samples, and each of the plurality of distinct digital event meta-training data samples: (i) corresponds to a distinct digital event associated with the target subscriber; (ii)

comprises a digital threat score of the distinct digital event, wherein the digital threat score is computed by an ensemble of production-implemented digital threat scoring machine learning models; (iii) comprises a distinct feature value of each of the plurality of digital event features, wherein the distinct feature value is extracted from the distinct digital event via one or more feature extractor algorithms; and (iv) defines a chargeback label indicating if the distinct digital event relates to a chargeback event.

In some embodiments, the plurality of distinct digital event classification paths include: (a) one or more first distinct digital event classification paths that are configured to classify a subject digital event as likely relating to a digital fraud event; and (b) one or more second distinct digital event classification paths that are configured to classify the subject digital event as likely relating to genuine digital activity, and the plurality of distinct automated digital event decisioning routes defined in the probationary automated fraud or abuse detection workflow include: (c) one or more first distinct automated digital event decisioning routes corresponding to the one or more first distinct digital event classification paths, wherein the one or more first distinct automated digital event decisioning routes enable a target digital event to be processed to completion; and (d) one or more second distinct automated digital event decisioning routes corresponding to the one or more second distinct digital event classification paths, wherein the one or more second distinct automated digital event decisioning routes prevent a target digital event from being processed to completion.

In some embodiments, each of the plurality of distinct digital event classification paths of the digital event meta machine learning model comprises one or more distinct digital event decisioning criterion, each of the one or more distinct digital event decisioning criterion relates to a Boolean expression that assess a distinct digital event feature of the plurality of distinct digital event features against a numerical or categorical digital event feature value computed by the digital event meta machine learning model, each distinct automated digital event decisioning route of the one or more first distinct automated digital event decisioning routes relates to a distinct digital event classification path of the one or more first distinct digital event classification paths, and setting the distinct route execution condition for each distinct automated digital event decisioning route of one or more first distinct automated digital event decisioning routes includes: (i) extracting, via the one or more computers, each distinct digital event decisioning criterion defined in a distinct digital event classification path relating to a distinct automated digital event decisioning route of the one or more first distinct automated digital event decisioning routes; and (ii) adding, via the one or more computers, the each distinct digital event decisioning criterion extracted from the distinct digital event classification path to the distinct route execution condition of the distinct automated digital event decisioning route relating to the distinct digital event classification path.

In some embodiments, the plurality of distinct digital event features include a digital threat score feature, the digital threat score feature indicates a likeliness of the subject digital event relating to digital fraud on a scale from 0 to 100; and at least one of the each distinct digital event decisioning criterion relates to a Boolean expression that assesses the digital threat score feature of the subject digital event against a predetermined digital threat score value computed by the digital event meta machine learning model.

In some embodiments, each distinct automated digital event decisioning route of the one or more second distinct automated digital event decisioning routes relates to a distinct digital event classification path of the one or more second distinct digital event classification paths, and setting the distinct route execution condition for each distinct automated digital event decisioning route of one or more second automated digital event decisioning routes includes: (i) extracting, via the one or more computers, each distinct digital event decisioning criterion defined in the distinct digital event classification path relating to a distinct automated digital event decisioning route of the one or more second automated digital event decisioning routes; and (ii) adding, via the one or more computers, the each distinct digital event decisioning criterion extracted from the distinct digital event classification path to the distinct route execution condition of the distinct automated digital event decisioning route.

In some embodiments, the plurality of distinct digital event decisioning criteria are derived from one or more feature distribution graphs, and automatically deriving the plurality of distinct digital event decisioning criteria includes: (1) constructing, via the one or more computers, a distinct feature distribution graph for each of the plurality of distinct digital event features; and (2) automatically assessing, via the one or more computers, the distinct feature distribution graph constructed for each of the plurality of distinct digital event features.

In some embodiments, the distinct feature distribution graph constructed for each of the plurality of distinct digital event features comprises a plurality of distinct axes, including a feature value axis, a feature frequency axis, and a digital threat score axis; each of the distinct feature distribution graphs corresponds to a target distinct digital event feature of the plurality of digital event features; and constructing the distinct feature distribution graph for each of the plurality of digital event features includes: plotting, via the one or more computers, a plurality of distinct graphical points on the distinct feature distribution graph, wherein: (a) each of the plurality of distinct graphical points relates to a distinct digital event data sample underlying the digital event data corpus; and (b) each of the plurality of distinct graphical points is plotted based on (i) a value of the target distinct digital event feature for the distinct digital event data sample, (ii) a computed frequency of the value of the target digital event feature in the digital event data corpus, and (iii) a digital threat score value computed for the distinct digital event data sample.

In some embodiments, the digital event data corpus comprises a plurality of distinct digital event data samples, the plurality of distinct digital event data samples underlying the digital event data corpus include: (a) a plurality of digital event samples that are associated with a digital chargeback event, and (b) a plurality of digital event samples that are not associated with a digital chargeback event; each of the distinct feature distribution graphs relates to a distinct target digital event feature of the plurality of digital event features; and automatically deriving the plurality of distinct digital event decisioning criteria based on the distinct feature distribution graph includes: (1) automatically deriving, via the one or computers, a first distinct feature value range of the distinct target digital event feature that relates to at least a threshold amount of the plurality of digital event samples that are associated with the digital chargeback event, and (2) automatically deriving, via the one or computers, a second distinct feature value range of the distinct target digital event feature that relates to at least a threshold amount of the plurality of digital event samples that are not associated with the digital chargeback event.

In some embodiments, the plurality of distinct automated digital event decisioning routes defined in the probationary automated fraud or abuse detection workflow include: (1) a first distinct automated digital event decisioning route that prevents a subject digital event from being processed to completion; (2) a second distinct automated digital event decisioning route that enables a subject digital event to be processed to completion; and (3) a third distinct automated digital event decisioning route that routes the subject digital event to a review queue associated with the target subscriber, setting the distinct route execution condition of the first distinct automated digital event decisioning route includes defining a Boolean expression that evaluates if the distinct target digital event feature of the subject digital event has a value within the first distinct feature value range, setting the distinct route execution condition of the second distinct automated digital event decisioning route includes defining a Boolean expression that evaluates if the value of the distinct target digital event feature exists within the second distinct feature value range, and setting the distinct route execution condition of the third distinct automated digital event decisioning route includes defining a Boolean expression that evaluates if the value of the distinct target digital event feature exists between the first and the second distinct feature value range.

In some embodiments, the machine learning-based method includes simulating, via the one or computers, the probationary automated fraud or abuse detection workflow based on a corpus of historical digital events associated with the target subscriber; computing one or more efficacy metrics for the probationary automated fraud or abuse detection workflow based on the simulation; identifying that the probationary automated fraud or abuse detection workflow does not satisfy the pre-determined workflow performance criteria; and iteratively tuning, via the one or more computers, the probationary automated fraud or abuse detection workflow until the probationary automated fraud or abuse detection workflow satisfies the pre-determined workflow performance criteria.

In some embodiments, the distinct route execution condition for each of the plurality of distinct automated digital event decisioning routes comprises a subset of the plurality of distinct digital event decisioning criterion defined in a distinct digital event classification path related to each of the plurality of distinct automated digital event decisioning routes, iteratively tuning, via the one or more computers, the automated fraud or abuse detection workflow includes iteratively tuning the distinct route execution condition for each of the plurality of automated digital event decisioning routes, and iteratively tuning the route execution condition of a subject automated digital event decisioning route includes: identifying, via the one or more computers, a distinct digital event decisioning criterion that is included in the distinct digital event classification path related to the subject automated digital event decisioning route and not included in the distinct route execution condition of the subject automated digital event decisioning route; and adding, via the one or more computers, the distinct digital event decisioning criterion to the distinct route execution condition of the subject automated digital event decisioning route.

In some embodiments, the identifying the distinct digital event decisioning criterion and the adding the distinct digital event decisioning criterion are iteratively performed until the probationary automated fraud or abuse detection workflow satisfies the pre-determined workflow performance criteria.

In some embodiments, the distinct route execution condition automatically set for each of the plurality of distinct automated digital event decisioning routes in the automated fraud or abuse detection workflow includes a first number of distinct digital event decisioning criteria, and iteratively tuning the automated fraud or abuse detection workflow causes the distinct route execution condition for each of the plurality of distinct automated digital event decisioning routes to comprise a second number of distinct digital event decisioning criteria, greater than the first number of distinct digital event decisioning criteria.

In some embodiments, the target subscriber has previously deployed an incumbent automated fraud or abuse detection workflow to the digital threat mitigation platform, the probationary automated fraud or abuse detection workflow is automatically constructed for the target subscriber based on the digital threat mitigation platform identifying that the incumbent automated fraud or abuse detection workflow does not satisfy pre-determined workflow performance criteria, and deploying the probationary automated fraud or abuse detection workflow to the target digital fraud prevention environment includes: replacing, via the one or computers, the incumbent automated fraud or abuse detection workflow with the probationary automated fraud or abuse detection workflow.

In some embodiments, the target subscriber satisfies new subscriber criteria of the digital threat mitigation platform, and the probationary automated fraud or abuse detection workflow is automatically constructed for the target subscriber based on the digital threat mitigation platform identifying that the target subscriber has deployed or created less than a threshold number of automated fraud or abuse detection workflows.

In some embodiments, a computer-program product embodied in a non-transitory machine-readable storage medium stores computer instructions that, when executed by one or more processors, perform operations comprising: identifying, via the one or more processors, a plurality of distinct digital event features indicative of digital fraud based on an assessment of a digital event data corpus associated with a target subscriber; automatically deriving, via the one or more processors, a plurality of distinct digital event decisioning criteria based on the plurality of distinct digital event features and the digital event data corpus; automatically constructing, via the one or more processors, a probationary automated fraud or abuse detection workflow based on the plurality of distinct digital event decisioning criteria, wherein automatically constructing the probationary automated fraud or abuse detection workflow includes: (a) defining, via the one or more processors, a plurality of distinct automated digital event decisioning routes in the probationary automated fraud or abuse detection workflow, and (b) setting, via the one or more processors, a distinct route execution condition for each of the plurality of distinct automated digital event decisioning routes based on the plurality of distinct digital event decisioning criteria; and deploying, via the one or more processors, the probationary automated fraud or abuse detection workflow to a target digital fraud prevention environment of the target subscriber based on identifying efficacy metrics computed for the automated fraud or abuse detection workflow satisfy pre-determined workflow performance criteria.

In some embodiments, a computer-implemented system comprises one or more processors; a memory; a computer-readable medium operably coupled to the one or more processors, the computer-readable medium having computer-readable instructions stored thereon that, when executed by the one or more processors, cause the computing device to perform operations comprising: identifying, via the one or more processors, a plurality of distinct digital event features indicative of digital fraud based on an assessment of a digital event data corpus associated with a target subscriber; automatically deriving, via the one or more processors, a plurality of distinct digital event decisioning criteria based on the plurality of distinct digital event features and the digital event data corpus; automatically constructing, via the one or more processors, a probationary automated fraud or abuse detection workflow based on the plurality of distinct digital event decisioning criteria, wherein automatically constructing the probationary automated fraud or abuse detection workflow includes: (a) defining, via the one or more processors, a plurality of distinct automated digital event decisioning routes in the probationary automated fraud or abuse detection workflow, and (b) setting, via the one or more processors, a distinct route execution condition for each of the plurality of distinct automated digital event decisioning routes based on the plurality of distinct digital event decisioning criteria; and deploying, via the one or more processors, the probationary automated fraud or abuse detection workflow to a target digital fraud prevention environment of the target subscriber based on identifying efficacy metrics computed for the automated fraud or abuse detection workflow satisfy predetermined workflow performance criteria.

DESCRIPTION OF THE PREFERRED EMBODIMENTS

Figure 1:
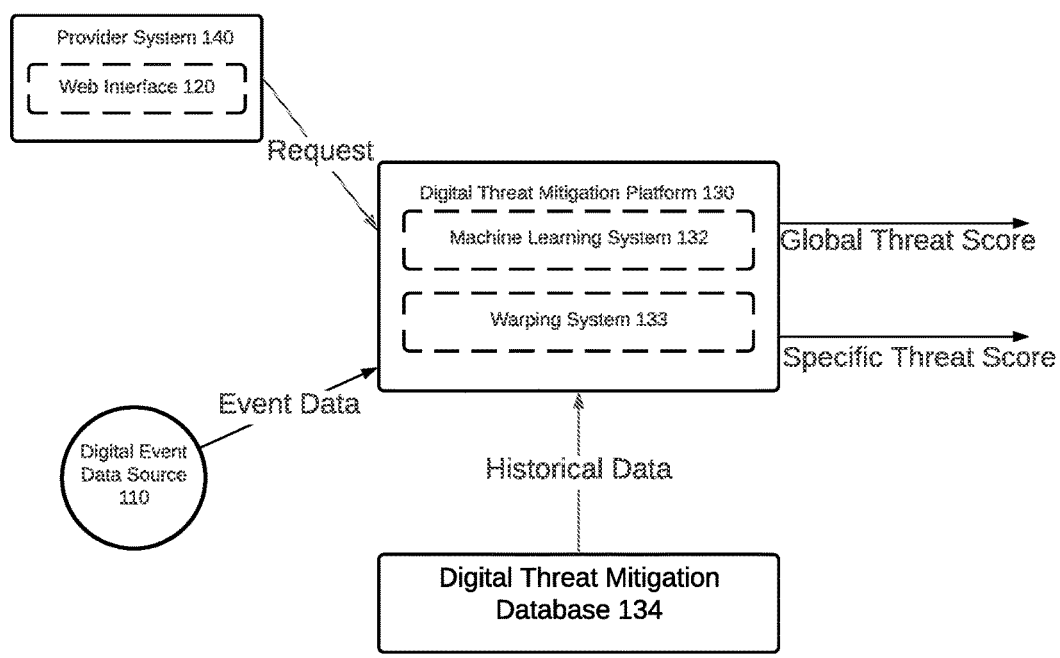
FIG. 1 illustrates a schematic representation of an exemplary system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954, 879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, and/or the like). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954, 879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, and/or the like) of the service providers. The digital events data and digital activities data collected by the one or more digital event data sources no may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, and/or the like) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, a linear discriminate analysis, and/or the like), a clustering method (e.g., k-means clustering, density-based spatial clustering of applications with noise (DBSCAN), expectation maximization, and/or the like), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, and/or the like), an artificial neural network model (e.g., a Perceptron method, a backpropagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial lest squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, and/or the like) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

Figure 2:
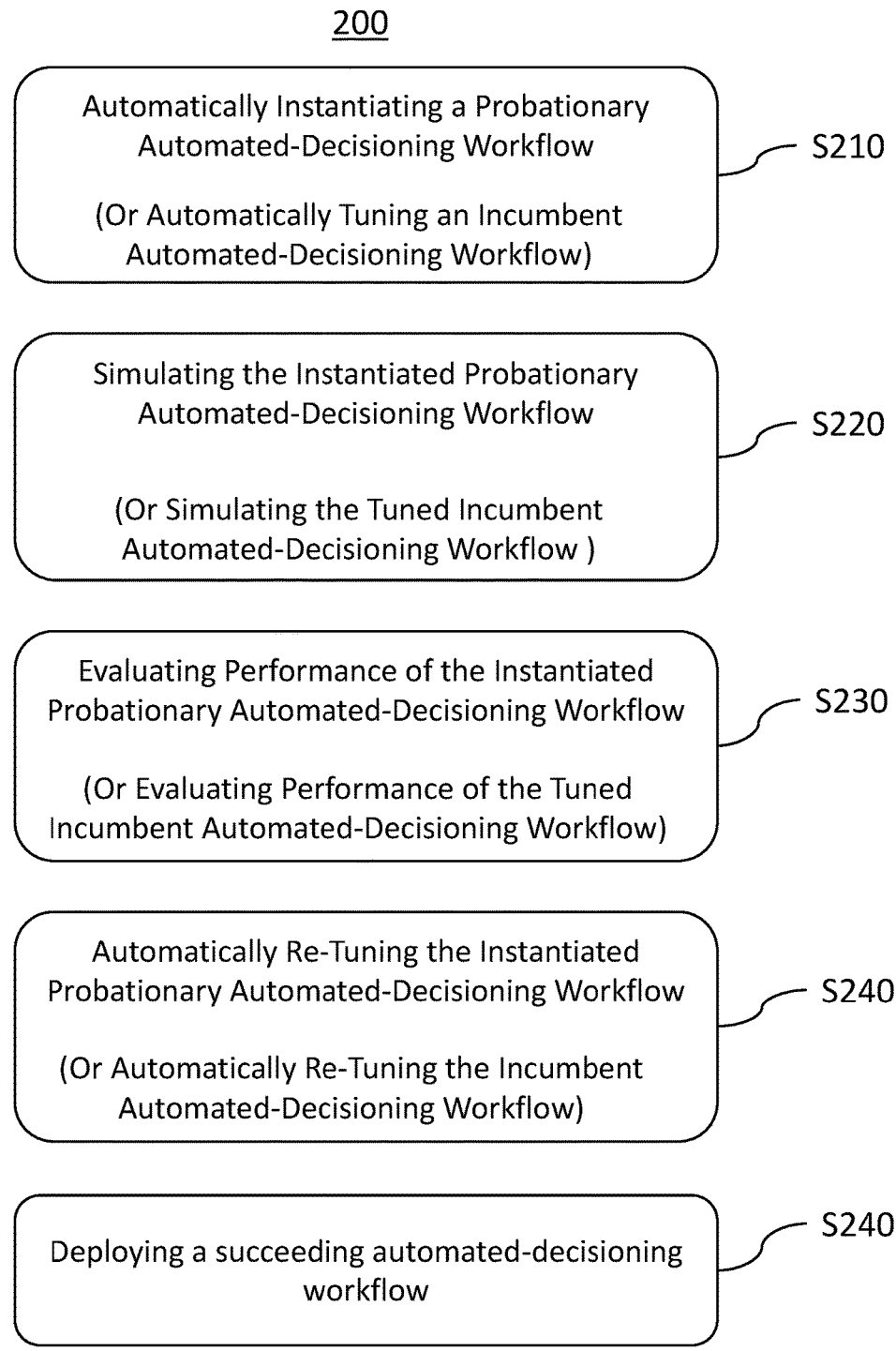
FIG. 2 illustrates an exemplary method in accordance with one or more embodiments of the present application.

2. Method for Generating a Probationary Automated-Decisioning Workflow or Tuning an Incumbent Automated-Decisioning Workflow As shown in FIG. 2, the method 200 for generating a probationary automated-decisioning workflow or tuning an incumbent automated-decisioning workflow includes automatically instantiating a probationary automated-decisioning workflow or automatically tuning an incumbent automated-decisioning workflow (S210), simulating the instantiated probationary automated-decisioning workflow or the tuned incumbent automated-decisioning workflow (S220), evaluating performance of the instantiated probationary automated-decisioning workflow or the tuned incumbent automated-decisioning workflow (S230), automatically re-tuning the instantiated probationary automated-decisioning workflow or the incumbent automated-decisioning workflow (S240), and deploying a succeeding automated-decisioning workflow (S250).

2.10 Instantiating or Tuning an Automated-Decisioning Workflow

S210, which includes automatically instantiating a probationary automated-decisioning workflow or automatically tuning an incumbent automated-decisioning workflow, may function to automatically instantiate the probationary automated-decisioning workflow or automatically tune the incumbent automated-decisioning workflow based on a subscriber status. As will be described in more detail herein, a probationary or an incumbent automated-decisioning workflow may function to evaluate and process, in real time, threat data (e.g., threat scores, event features, and/or the like) associated with digital events received by a system or service implementing the method 200 ("digital threat mitigation service"). In some embodiments, digital events that may be processed by the probationary or incumbent automated-decisioning workflow may include digital purchase events, digital account opening events, digital account login events, digital update order events, digital content posting events, and/or any other digital event that may occur over the Internet and other web-enabled systems or devices.

New Subscribers

In some embodiments, S210 may function to identify a new subscriber to the digital threat mitigation service and, in response, automatically instantiate one or more probationary automated-decisioning workflows for the new subscriber. A subscriber of the digital threat mitigation service may be identified as a new subscriber if the subscriber has subscribed to the digital threat mitigation service for less than a threshold amount of time (e.g., less than a minimum number of days or the like) and/or has used less than a threshold number of features provided by the digital threat mitigation service (e.g., less than a minimum number of services provided by the digital threat mitigation service). Additionally, or alternatively, S210 may function to automatically instantiate one or more probationary automated-decisioning workflows for the new subscriber in response to S210 determining that the new subscriber has deployed less than a predetermined or optimal number of automated-decisioning workflows to the digital threat mitigation service (e.g., less than 30, 20, 10, 5 or 1 automated-decisioning workflows).

In some embodiments, the one or more probationary automated-decisioning workflows instantiated for the new subscriber may be automatically configured by S210 (e.g., the automated-decisioning workflows do not need to be manually configured by the new subscriber). In one implementation of such embodiments—and as will be described in greater detail herein—to automatically configure the one or more probationary automated-decisioning workflows, S210 may function to identify a plurality of automated-decisioning cohort workflows, assess the plurality of automated-decisioning cohort workflows, and/or automatically configure the one or more probationary automated-decisioning workflows for the target new subscriber based on the assessment of the plurality of automated-decisioning cohort workflows.

As generally referred to herein, automated-decisioning cohort workflows may be or relate to automated-decisioning workflows that have been deployed by subscribers similar to the new subscriber (e.g., subscribers that belong to a same cohort as the new subscriber). It shall be noted that subscribers that belong to the same cohort as the new subscriber ("cohort subscribers") preferably share one or more common characteristics with the new subscriber, such as a same or similar industry, a same or similar number of employees, a same or similar operating revenue, a same or similar operating profit, and/or the like.

Instantiating Digital Fraud or Abuse Workflows based on Cohort Subscribers

In some embodiments, S210 may function to determine which type(s) of automated-decisioning workflows to instantiate for the new subscriber based on an assessment of the automated-decisioning cohort workflows. For instance, if S210 determines that more than a threshold amount (e.g., a minimum number or percentage) of the cohort subscribers have deployed one or more distinct automated-decisioning workflows directed to handling/processing one or more distinct types of digital fraud or digital abuse (e.g., payment abuse, account abuse, content abuse, promotion abuse, and/or the like), S210 may function to instantiate, for the new subscriber, one or more probationary automated-decisioning workflows directed to handling/processing the one or more distinct types of digital fraud or abuse.

Selecting and/or Setting Triggering or Use Conditions

In some embodiments, automatically configuring a probationary automated-decisioning workflow may include automatically defining and/or setting one or more triggering, instantiation, or use conditions for the probationary automated-decisioning workflow (e.g., defining circumstances when the threat mitigation service implements, instantiates, executes or uses the probationary automated-decisioning workflow). In such embodiments, S210 may function to identify automated-decisioning cohort workflows directed to handling/processing a same type of digital fraud or digital abuse as the probationary automated-decisioning workflow, assess the instantiation or use conditions defined in the identified automated-decisioning cohort workflows, and/or automatically set the use condition(s) of the probationary automated-decisioning workflow based on the assessment of the use conditions defined in the automated-decisioning cohort workflows.

In some embodiments, assessing the use conditions defined in the automated-decisioning cohort workflows may include determining the use condition most frequently defined in the automated-decisioning cohort workflows. Thus, in such embodiments, automatically configuring the use condition(s) for the probationary automated-decisioning workflow based on the assessment of the use conditions defined in the automated-decisioning cohort workflows may include setting the use condition(s) of the probationary automated-decisioning workflow to correspond to the use condition(s) that was determined to be most frequently defined in the automated-decisioning cohort workflows. Accordingly, in such embodiments, S210 may function to identify the one or more use conditions for a target probationary workflow based on one or more statistical analyses of use conditions of the automated-decisioning cohort workflows.

It shall be noted that the use condition(s) of the probationary automated-decisioning workflow may be automatically set, by S210, based on performing other statistical determinations with respect to the automated-decisioning cohort workflows without departing from the scope of the disclosure. Furthermore, it shall also be noted, that S210 may function to automatically set the use condition(s) of other probationary automated-decisioning workflows also instantiated for the new subscriber in analogous ways described above.

Adding Automated-Decisioning Routes

In some embodiments, automatically configuring an instantiated probationary automated-decisioning workflow includes automatically adding one or more types of automated-decisioning routes to the instantiated probationary automated-decisioning. As will be described in greater detail herein, the types of automated-decisioning routes that may be automatically added to the probationary automated-decisioning workflow may include automated-decisioning routes or event disposal routes that enable a disposal of a subject digital event (e.g., accept route, review route, block route, multi-factor authentication route, and/or the like). In one or more embodiments, one or more of the automated-decisioning routes may include an automated-decisioning route that enables a subject digital event to be executed to completion (e.g., acceptance), an automated-decisioning route that prevents a subject digital event from being executed to completion (e.g., block a completion of the subject digital event), an automated-decisioning route that routes a subject digital event to a review queue for expert review and analysis, and/or the like.

Accordingly, in such embodiments, S210 may function to identify automated-decisioning cohort workflows directed to handling/processing a same type of digital fraud or abuse as the probationary automated-decisioning workflow, assess the automated-decisioning routes defined in the identified automated-decisioning cohort workflows, and/or automatically add automated-decisioning routes to the probationary automated-decisioning workflows based on the assessment of the automated-decisioning routes defined in the automated-decisioning cohort workflows.

In some embodiments, assessing the automated-decisioning routes defined in the automated-decisioning cohort workflows may include determining which types of automated-decisioning routes have been defined in at least a threshold amount (e.g., a minimum number or percentage) of the automated-decisioning cohort workflows, and accordingly, automatically adding such automated-decisioning routes to the probationary automated-decisioning workflows. For instance, if S210 determined that more than a threshold amount of the identified automated-decisioning cohort workflows include an automated-decisioning route directed to allowing a digital event to be processed to completion and/or an automated-decisioning route directed to preventing a digital event from being processed to completion, S210 may function to add, to the instantiated probationary automated-decisioning workflow, an automated-decisioning route directed to allowing a digital event to be processed to completion and/or an automated-decisioning route directed to preventing a digital event from being processed to completion. Other types of automated-decisioning routes, such as multi-factor authentication route, a manual review queue route, etc., may be added to the instantiated probationary automated-decisioning workflow for similar reasons described above.

It shall be noted that automated-decisioning routes may be automatically added to the probationary automated-decisioning workflow based on performing other statistical determinations with respect to the automated-decisioning cohort workflows without departing from the scope of the disclosure. Further, it shall also be noted, that S210 may function to automatically add automated-decisioning routes to other probationary automated-decisioning workflows also instantiated for the new subscriber in analogous ways described above.

Setting Route Criteria

In some embodiments, automatically configuring an instantiated probationary automated-decisioning workflow includes automatically setting route execution criteria (e.g., conditions) for one or automated-decisioning routes defined in the probationary automated-decisioning workflow. As generally referred to herein, route execution criteria may govern when the digital threat mitigation system executes a corresponding or associated automated-decisioning route of a probationary automated-decisioning workflow.

In one or more embodiments, to automatically set route criteria for an automated-decisioning route defined in the probationary automated-decisioning workflow, S210 may function to identify automated-decisioning cohort workflows directed to handling the same type of digital fraud or abuse as the probationary automated-decisioning workflow, identify automated-decisioning routes in the automated-decisioning cohort workflows that are of the same type as the automated-decisioning route in the probationary automated-decisioning workflow (e.g., accept, block, or manual review), assess route criteria corresponding to the identified automated-decisioning routes that are of the same type as the automated-decisioning route in the probationary automated-decisioning workflow, and/or automatically configure route criteria for the automated-decisioning route in the probationary automated-decisioning route based on the assessment of the route criteria.

In some embodiments, assessing the route criteria of the automated-decisioning routes that are of the same type as the automated-decisioning route in the probationary automated-decisioning workflow may include identifying digital event features that have been associated with more than a threshold amount (e.g., a minimum number or percentage) of the identified route criteria and computing a minimum, maximum, average, median, and/or the like threshold value across each route criterion associated with the identified digital event features. Accordingly, in such embodiments, automatically defining/configuring route criteria for the automated-decisioning route in the probationary automated-decisioning may include defining route criteria that includes one or more of the identified digital event features and the associated statistical thresholds as criterion (e.g., rout execution conditions).

Existing Subscribers

Additionally, or alternatively, S210 may function to automatically tune automated-decisioning workflows currently deployed (or previously deployed) to the digital threat mitigation service by existing subscribers and/or new subscribers. It shall be noted that, in some portions of the disclosure, an automated-decisioning workflow currently or previously deployed to the digital threat mitigation service may referred to as an "incumbent automated-decisioning workflow." Further, it shall also be noted that an existing subscriber of the digital threat mitigation service may be a subscriber that did not satisfy the new subscriber criteria previously described herein.

In such embodiments, S210 may function to automatically tune an incumbent automated-decisioning workflow in response to S210 determining/detecting that the incumbent automated-decisioning workflow may not satisfy predetermined performance criteria (e.g., efficacy metrics and/or the like). In a first implementation, S210 may function to determine/detect that the incumbent automated-decisioning workflow may not satisfy predetermined performance criteria in response to determining/detecting an "insult rate" or "insult cost" associated with the incumbent automated-decisioning workflow is more than a predetermined threshold (e.g., a maximum number, insult rate, insult cost, and/or the like). In a second implementation, S210 may function to determine/detect that the incumbent automated-decisioning workflow may not satisfy the predetermined performance criteria in response to determining that the "detected fraud rate" associated with the incumbent automated-decisioning workflow is lower than a predetermined threshold. Additional details relating to the above-described efficacy metrics and when the method 200 may detect that an incumbent automated-decisioning workflow does not satisfy predetermined performance criteria will be described in greater detail in S230 and S240.

In some embodiments, automatically tuning an incumbent automated-decisioning workflow includes configuring and/or training an automated-decisioning workflow tuning classifier (e.g., a decision tree, random forest, meta-learning model, and/or the like) and updating one or more of the route conditions defined in the incumbent automated-decisioning workflow based on inferences and/or classification paths/rules generated by the automated-decisioning workflow tuning classifier.

Training an Automated-Decisioning Workflow Tuning Classifier

The automated-decisioning workflow tuning classifier may be trained with a (e.g., meta-learning) training corpus that includes a plurality of training data samples. Each of the training samples included in the training corpus may correspond to a distinct digital event processed by the incumbent automated-decisioning workflow and may include pieces of data corresponding to one or more respective features (e.g., a feature corpus) of the distinct digital event, such as a first piece of data corresponding to an IP address of the distinct digital event, a second piece of data corresponding to a purchase amount associated with the distinct digital event, a third piece of data corresponding to a user ID associated with the distinct digital event, a fourth piece of data corresponding to an electronic device ID associated with the distinct digital event, a fifth piece of data corresponding to a threat score computed for the digital event (e.g., as described in system 100, and/or the like. Additionally, the plurality of training samples may be labeled to indicate if the plurality of digital events corresponding to the plurality of training samples may have included digital abuse or digital fraud (e.g., a bad label, chargeback digital event, or the like) or not (e.g., a good label, genuine digital activity, or the like). It shall be noted that, in some embodiments, each of the one or more features of a subject digital event defined in the training corpus may be indicative of digital fraud. It shall also be noted that, in some portions of the disclosure, the training corpus may be referred to as a "digital event data corpus" or the like.

Figure 3:
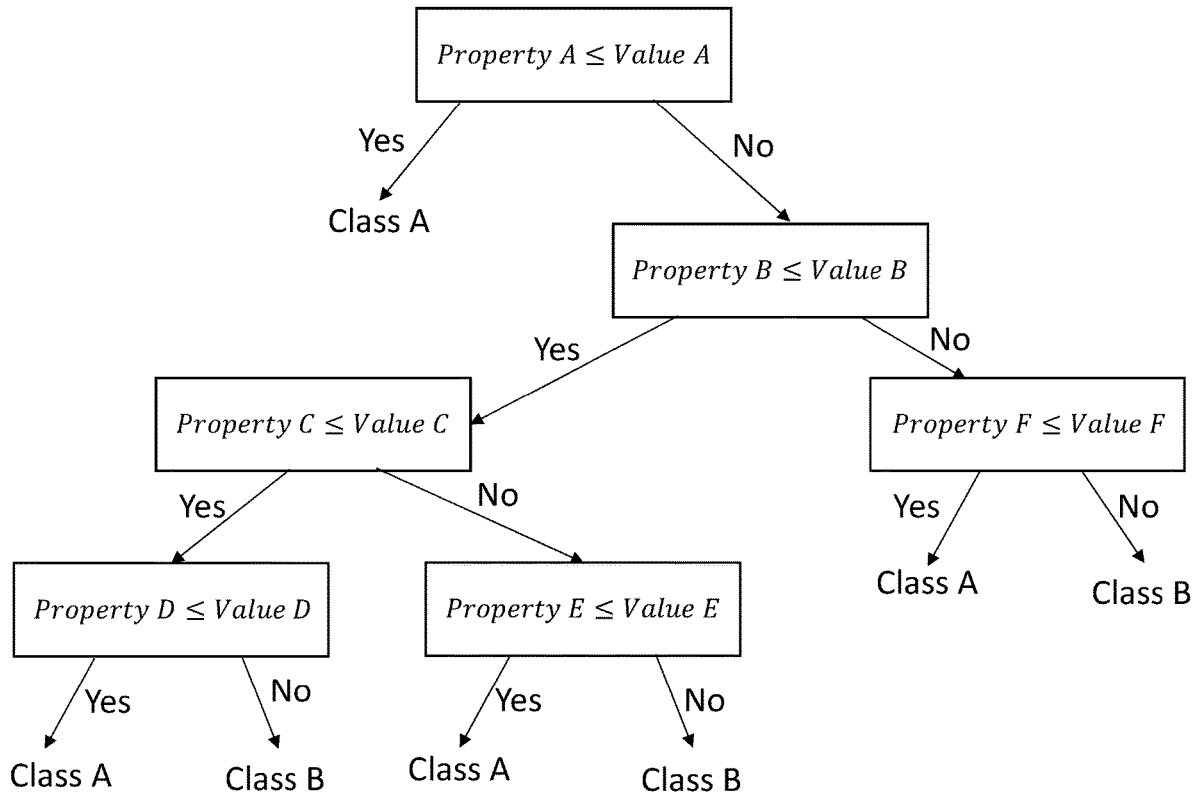
FIG. 3 illustrates example classification path(s) produced by an automated-decisioning workflow tuning classifier in accordance with one or more embodiments of the present application.

After training the automated-decisioning workflow tuning classifier with the above-described training corpus, the automated-decisioning workflow tuning classifier may produce/generate a plurality of classification paths (or classification rules), as generally illustrated in FIG. 3. The classification paths may be exposed and used by the automated-decisioning workflow tuning classifier to classify a ninputted or provided target digital event as a fraudulent digital event or a non-fraudulent digital event based on the features of the target digital event. Furthermore, as also generally illustrated in FIG. 3, each classification path may include a plurality of (e.g., Boolean) conditions/criteria. If the features of a subject digital event satisfy each of the conditions/criteria included in a respective classification path, the tree classifier may classify the subject digital event in accordance with that respective classification path.

For instance, the tree classifier may classify a target digital event as a fraudulent digital event (e.g., will result in a chargeback) if the features of the target digital event satisfy each of the conditions/criteria defined in a first (second, or third, etc.) classification path of the automated-decisioning workflow tuning classifier. Conversely, the automated-decisioning workflow tuning classifier may classify the target digital event as a valid digital event (e.g., will not result in a chargeback) if the features of the target digital event satisfy each of the conditions/criteria defined in a fourth (fifth, or sixth, etc.) classification path of the automated-decisioning workflow tuning classifier.

Additionally, after training the automated-decisioning workflow tuning classifier, S210 may function to tune one or more route criteria defined in the incumbent automated-decisioning workflow based on one or more classification paths generated by the automated-decisioning workflow tuning classifier. In such embodiments, tuning the route criteria of an automated-decisioning route may include (e.g., traversing) identifying a classification path in the trained automated-decisioning workflow tuning classifier that matches an objective of the automated-decisioning route (e.g., a classification path directed to predicting a fraudulent digital event may have the same objective as an automated-decisioning route directed to preventing a potentially fraudulent digital event from being processed to completion), identifying (e.g., extracting) a digital event feature defined in both the route criteria of the target tuned automated-decisioning route and the identified classification path, identifying (e.g., extracting) the threshold value associated with the identified digital event feature in the identified classification path, and/or updating the threshold value associated with the digital event feature in the route criteria to match the threshold value associated with the digital event feature in the identified classification path. It shall be noted that tuning route criteria associated with an automated-decisioning route may also include updating, removing, adding, and/or the like route criteria in one or more similar ways described in S240. It shall also be noted that, in some portions of the disclosure, one or more of the above-described processes or techniques (or in one or more downstream steps of the method 200) may be used by the method 200 to derive a plurality of distinct digital event decisioning criteria that may inform a setting of route conditions in a target automated-decisioning workflow.

2.20 Simulating an Automated-Decisioning Workflow

S220, which includes simulating an instantiated probationary automated-decisioning workflow or a tuned incumbent automated-decisioning workflow, may function to simulate one or more probationary automated decisioning workflows instantiated by S210 or simulate one or more incumbent automated-decisioning workflows tuned by S210 with live and/or historical digital event data.

Simulating a Tuned Incumbent Automated-Decisioning Workflow with Live Digital Event Data To simulate an incumbent automated-decisioning workflow tuned by S210 ("tuned incumbent automated-decisioning workflow") with live digital event data, S220 may function to simulate the tuned incumbent automated-decisioning workflow in shadow mode (e.g., a first simulation mode). It shall be noted that while simulating the tuned incumbent automated-decisioning workflow in shadow mode, the incumbent automated-decisioning workflow (e.g., untuned version of the incumbent automated-decisioning workflow) may still be deployed to the digital threat mitigation service and may process/handle digital events received by digital threat mitigation service that match or satisfy the use condition of the incumbent automated-decisioning workflow.

Additionally, while simulating the tuned incumbent automated-decisioning workflow in shadow mode, S220 may function to simultaneously dispatch or forward the same digital events (or a copy of the same digital events) dispatched to the currently deployed version incumbent automated-decisioning workflow (e.g., in-production workflow or live version) to the tuned incumbent automated-decisioning workflow such that the decisioning outputs produced by the tuned incumbent automated-decisioning workflow can be compared, tracked, and/or measured against the decisioning outputs produced by the live version of the incumbent automated-decisioning workflow. It shall be noted that while simulating the tuned incumbent automated-decisioning workflow in shadow mode, the decisioning outputs produced by the tuned incumbent automated-decisioning workflow may not be returned or publicly exposed via a decisioning API or the like. Whereas the decisioning outputs produced by the live version incumbent automated-decisioning workflow may be exposed or publicly returned.

As generally referred to herein, a decisioning output produced by an automated-decisioning workflow may relate to a proposed disposal decision that, when executed, may cause a final or interim disposition, such as acceptance, block, review, and/or an authentication or verification of a target digital event. That is, if an automated-decisioning workflow routed a digital event to a first automated-decisioning route that allows the digital event to be processed to completion (e.g., because the features of the digital event satisfy the route execution condition of the first automated-decisioning route), the decisioning output may indicate that the digital event was executed by the first automated-decisioning route and/or was allowed to be processed to completion. Conversely, if an automated-decisioning workflow routed a digital event to a second automated-decisioning route that prevents the digital event from being processed to completion (e.g., because the features of the digital event satisfy the route execution condition of the second automated-decisioning route), the decisioning output may indicate that the digital event was executed by the second automated-decisioning route and/or was not allowed (i.e., blocked) to be processed to completion.

As will be described in more detail in S230 and S240, the decisioning outputs produced by the tuned incumbent automated-decisioning workflow may be logged/recorded and used to automatically evaluate performance of the tuned incumbent automated-decisioning workflow.

Simulating a Tuned Incumbent Automated-Decisioning Workflow with Historical Digital Events Additionally, or alternatively, S220 may function to simulate or test an incumbent automated-decisioning workflow tuned by S210 with a plurality of historical digital events. In such implementations, S220 may function to identify a plurality of historical digital events previously received by the digital threat mitigation service ("historical digital events") or sourced in any suitable manner. In some embodiments, identifying a plurality of historical digital events may include identifying digital events previously received by the digital threat mitigation system within a predetermined time window (e.g., last 1 month, last 6 months, last 3 years, spanning multiple years, and/or the like) and/or may include identifying digital events previously received by the digital threat mitigation system that match or satisfy the use condition of the tuned incumbent automated-decisioning workflow.

After (e.g., based on) identifying a corpus of historical digital events, S220 may function to dispatch or forward the plurality of historical digital events to the tuned incumbent automated-decisioning workflow. In response to S220 dispatching the plurality of historical digital events to the tuned incumbent automated-decisioning workflow, the tuned incumbent automated-decisioning workflow may process the plurality of historical digital events sequentially (or in parallel). Additionally, for each digital event evaluated and processed by the tuned incumbent automated-decisioning workflow, S220 may function to log or record the decisioning outputs produced by the tuned incumbent automated-decisioning workflow—which may be used to automatically evaluate and/or automatically re-tune the incumbent automated-decisioning workflow, as will be described in greater detail herein.

Simulating a Probationary Automated-Decisioning Workflow in Shadow Mode

Additionally, or alternatively, S220 may function to simulate or test a probationary automated-decisioning workflow instantiated by S210 ("instantiated probationary automated-decisioning workflow") in shadow mode. Simulating the probationary automated-decisioning workflow in shadow mode may include dispatching or forwarding, to the probationary automated-decisioning workflow, live digital events (or a copy of the live digital events) that match or satisfy the triggering or use condition of the probationary automated-decisioning workflow. It shall be noted, as generally referred to herein, live digital events may be digital events presently or currently being received by the digital threat mitigation system (e.g., and may not be historical digital events previously received by the digital threat mitigation service).

After dispatching a live digital event to a probationary automated-decisioning workflow, the probationary automated-decisioning workflow may function to evaluate and process the live digital event as if the probationary automated-decisioning workflow was actually deployed to the digital threat mitigation service (e.g., not being simulated in shadow mode). In other words, in response to the probationary automated-decisioning workflow receiving a live digital event, the probationary automated-decisioning workflow may function to determine which route condition the feature(s) of the live digital event satisfy and process the live digital event via the automated-decisioning route that corresponds to the satisfied route condition. Accordingly, in similar ways described previously with respect to simulating a tuned incumbent automated-decisioning workflow in shadow mode, decisioning outputs produced by the probationary automated-decisioning workflow may be recorded or logged, and thus, used to automatically evaluate the performance of the probationary automated-decisioning workflow and/or to automatically re-tune the probationary automated-decisioning workflow.

Simulating a Probationary Automated-Decisioning Workflow with Historical Digital Events Additionally, or alternatively, S220 may function to simulate or test a probationary automated-decisioning workflow, instantiated by S210, with a plurality of historical digital events. In such implementations, S220 may function to identify a plurality of digital events previously received by the digital threat mitigation service ("historical digital events"). In some embodiments, identifying the plurality of historical digital events may include identifying digital events previously received by the digital threat mitigation system within a predetermined time window (e.g., last 1 month, last 6 months, last 3 years, and/or the like) and/or may include identifying digital events previously received by the digital threat mitigation system that match (satisfy) the use condition of the probationary automated-decisioning workflow.

After identifying a plurality of historical digital events, S220 may function to dispatch or forward the plurality of historical digital events to the probationary incumbent automated-decisioning workflow. In turn, the probationary automated-decisioning workflow may process the plurality of historical digital events sequentially (or in parallel). Additionally, for each digital event evaluated and processed by the probationary automated-decisioning workflow, S220 may function to log or record the decisioning outputs produced by the probationary automated-decisioning workflow— which may be used to automatically evaluate and/or automatically re-tune the probationary automated-decisioning workflow, as will be described in greater detail herein.

2.30 Assessing Performance of a Simulated Automated-Decisioning Workflow

S230, which includes evaluating performance of an instantiated probationary automated-decisioning workflow or a tuned incumbent automated-decisioning workflow, may function to assess the simulated performance of the instantiated probationary automated-decisioning workflow or the tuned incumbent automated-decisioning workflow by computing one or more efficacy metrics.

Probationary Automated-Decisioning Efficacy Metrics

In one or more embodiments, after simulating a probationary automated-decisioning workflow in S220, S230 may function to compute one or more efficacy metrics, such as an "insult rate" of the simulated probationary automated-decisioning workflow (e.g., the percentage of digital events that were not associated with a chargeback, but were prevented from being executed to completion). It shall be noted that one or more of the efficacy metrics computed by S230 may depend on chargeback data associated with digital events processed by the probationary automated-decisioning workflow. Accordingly, in such cases, S230 may function to identify or source chargeback data associated with the digital events—thus allowing for such efficacy metrics to be computed. Thus, in some embodiments, the system implementing method 200 may receive, from a respective subscriber, one or more chargeback digital events indicating that one or more of the digital events dispatched to the probationary automated-decisioning workflow (or the incumbent automated-decisioning workflow) resulted in a chargeback digital event.

Additionally, or alternatively, after simulating a probationary automated-decisioning workflow in S220, S230 may function to compute a "missed fraud rate" for the simulated probationary automated-decisioning workflow (e.g., the percentage of digital events that the probationary automated-decisioning workflow allowed to be executed to completion but resulted in a chargeback), an "auto-accept" rate for the simulated probationary automated-decisioning workflow (e.g., the number of digital events that the probationary automated-decisioning workflow allowed to be executed to completion relative to the number of digital events that the probationary automated-decisioning did not allow to be automatically processed to completion), a "block rate" for the simulated probationary automated-decisioning workflow (e.g., the number of digital events that the probationary automated-decisioning workflow prevented from being executed to completion relative to the total number of digital events processed by the probationary automated-decisioning workflow), a "manual review rate" for the simulated probationary automated-decisioning workflow (e.g., the number of digital events that the probationary automated-decisioning workflow routed to a manual review queue relative to the total number of digital events processed by the probationary automated-decisioning workflow).

It should be understood that S230 may function to additionally, or alternatively, compute one or more other efficacy metrics for the simulated probationary automated-decisioning workflow without departing form the scope of the disclosure, such as a recall rate and/or an F1 score of the probationary automated-decisioning workflow.

Tuned Incumbent Automated-Decisioning Efficacy Metrics

Additionally, or alternatively, after simulating a tuned incumbent automated-decisioning workflow in S220, S230 may function to compute for the tuned incumbent automated-decisioning workflow the same or similar efficacy metrics described above with respect to the probationary automated-decisioning workflow.

2.40 Re-Tuning an Automated-Decisioning Workflow

S240, which includes automatically re-tuning the instantiated probationary automated-decisioning workflow or the incumbent automated-decisioning workflow, may function to automatically adjust/modify the probationary automated-decisioning workflow or the incumbent automated-decisioning workflow based on an evaluation of the one or more measured or computed efficacy metrics and/or in response to determining that the probationary automated-decisioning workflow or the incumbent automated-decisioning workflow may not satisfy simulation performance criteria.

Simulation Performance Criteria

In one or more embodiments, S240 may determine that a probationary automated-decisioning workflow simulated in S220 may not satisfy simulation performance criteria in response to determining that one or more of the efficacy metrics computed for the probationary automated-decisioning workflow in S230 may not satisfy one or more predetermined performance or efficacy thresholds (e.g., maximum insult rate, maximum missed fraud rate, and/or the like). For instance, in a non-limiting example, S240 may function to determine that a probationary automated-decisioning workflow simulated in S220 fails to satisfy simulation performance criteria in response to determining that the missed fraud rate of the probationary automated-decisioning workflow computed in S230 exceeds a target missed fraud rate threshold. It shall be noted that S240 may function to determine that an incumbent automated-decisioning workflow simulated in S220 may not satisfy simulation performance criteria in analogous ways described above.

Figure 4:
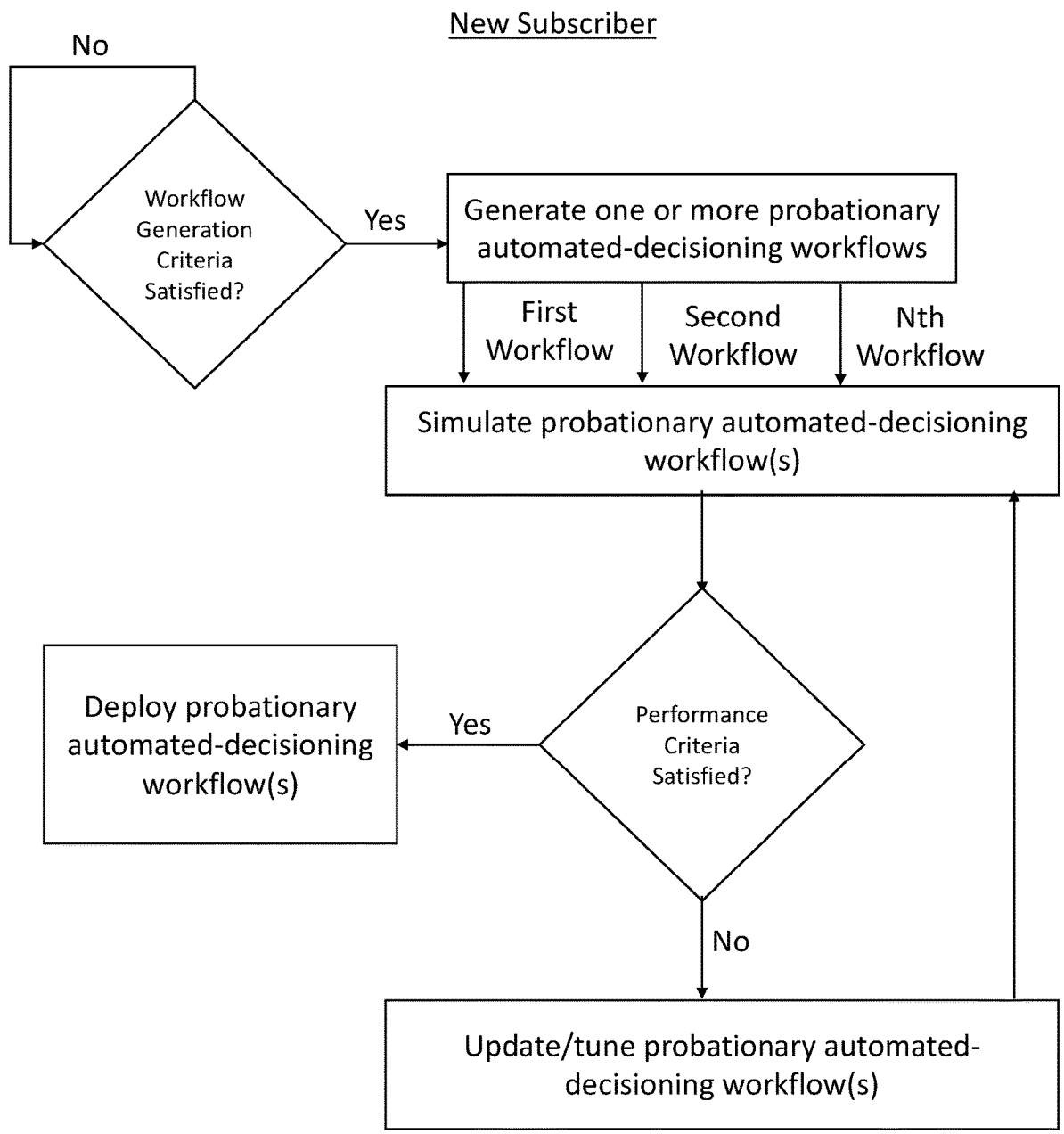
FIG. 4 illustrates an exemplary process for generating one or more probationary automated-decisioning workflows in accordance with one or more embodiments of the present application.
Figure 5:
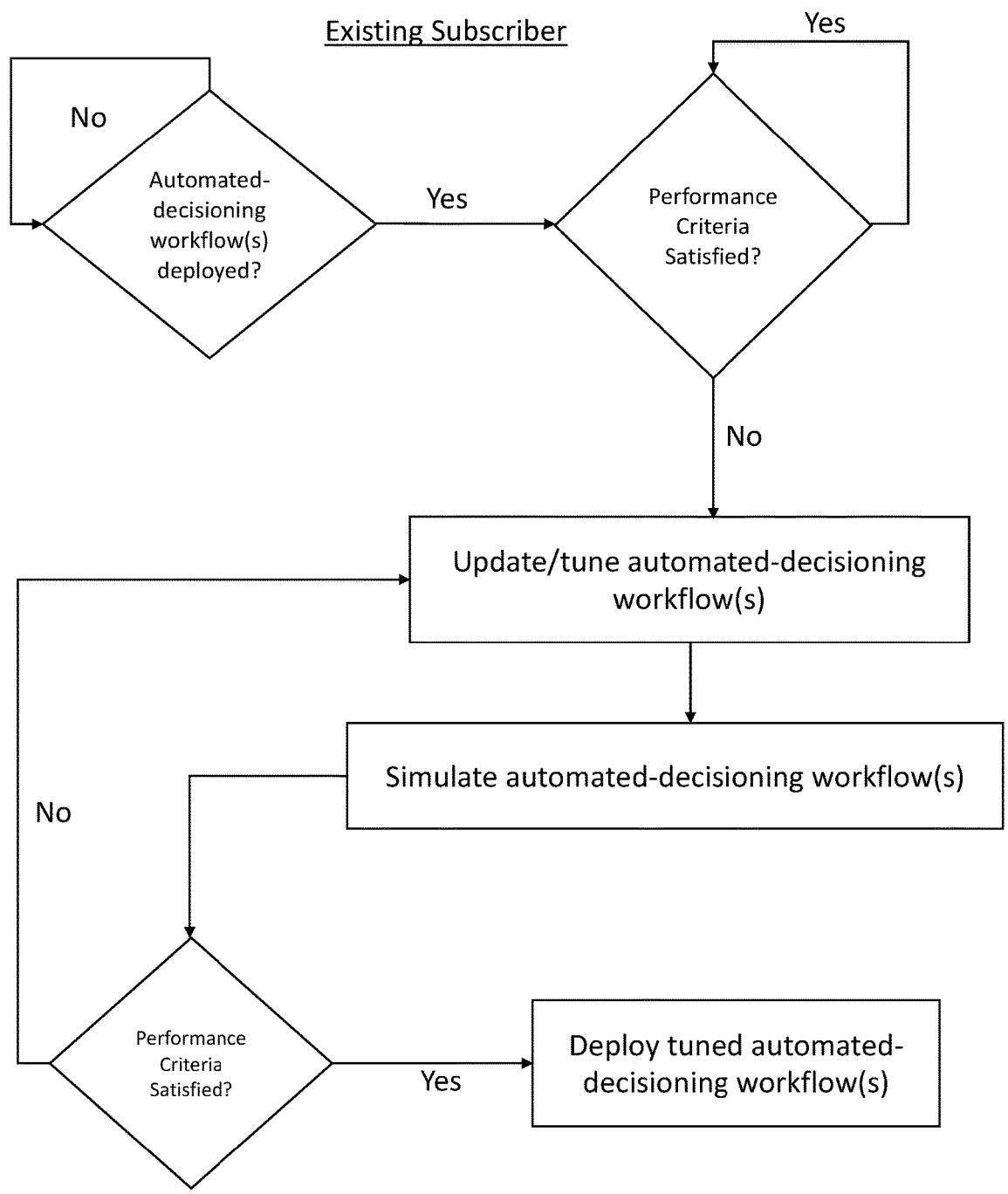
FIG. 5 illustrates an exemplary process for tuning one or more incumbent automated-decisioning workflows in accordance with one or more embodiments of the present application.

It shall also be noted that, in some embodiments, rather than determining that a probationary or tuned incumbent automated-decisioning workflow does not satisfy simulation performance criteria, S240 may function to determine that the probationary or the tuned incumbent automated-decisioning workflow simulated in S220 does satisfy simulation performance criteria. In such embodiments, as generally illustrated in FIGS. 4 and 5, method 200 may function to forgo automatically re-tuning the instantiated probationary automated-decisioning workflow or the incumbent automated-decisioning workflow and, instead, deploy the probationary or the tuned incumbent automated-decisioning workflow to production (as described in S250).

Automatically Re-Tuning a Probationary Automated-Decisioning Workflow

In one or more embodiments, automatically re-tuning the probationary automated-decisioning workflow may include automatically training an automated-decisioning workflow tuning classifier (e.g., in a similar manner described in S210) and automatically modifying route criteria of one or more automated-decisioning routes defined in the probationary automated-decisioning workflow based on one or more classification paths of the automated-decisioning workflow tuning classifier. The below description will describe embodiments directed to modifying route criteria associated with a single automated-decisioning route, but it shall be noted that S240 may function to modify route criteria corresponding to a plurality of automated-decisioning routes in similar ways.

In a first implementation, automatically modifying route criteria for an automated-decisioning route in the probationary automated-decisioning workflow may include adding a new criterion to the current route criteria associated with the automated-decisioning route. In such implementations, S240 may function to identify a classification path matching the objective of the automated-decisioning route (e.g., a classification path directed to classifying a digital event as a valid digital event may have the same objective as an automated-decisioning route directed to allowing a digital event to be processed to completion). Afterwards, S240 may additionally function to identify a criterion in the classification path that is associated with a digital event feature not currently defined in the route criteria of the automated-decisioning route, and in response, automatically update the route criteria of the automated-decisioning route to include the identified criterion from the classification path.

In a second implementation, automatically modifying route criteria for an automated-decisioning route in the probationary automated-decisioning workflow may include removing a criterion currently included (existing in) the route criteria associated with the automated-decisioning route. In such implementations, S240 may function to identify a classification path matching the objective of the automated-decisioning route (e.g., a classification path directed to classifying a digital event as a fraudulent digital event may have the same objective as an automated-decisioning route directed to preventing a digital event from being processed to completion). Afterwards, S240 may additionally function to identify a criterion included the route criteria of the automated-decisioning workflow that is associated with a digital event feature not currently included in the identified classification path, and in response, automatically remove the identified criterion from the route criteria of the automated-decisioning route.

In a third implementation, automatically modifying route criteria for an automated-decisioning route in the probationary automated-decisioning workflow may include tuning a criterion currently existing in the route criteria. In such implementations, S240 may function to identify a classification path that matches an objective of the automated-decisioning route (e.g., a classification path directed to predicting a fraudulent digital event may have the same objective as an automated-decisioning route directed to preventing a potentially fraudulent digital event from being processed to completion), identify a digital event feature defined in both the route criteria of the to be tuned automated-decisioning route and the identified classification path, and identify the threshold value associated with the identified digital event feature in the identified classification path. Accordingly, in response to identifying the above-described data, S240 may further function to update (e.g., tune) the threshold value associated with the digital event feature in the route criteria to match the threshold value associated with the digital event feature in the identified classification path.

Additionally, or alternatively, in some embodiments, after determining that the probationary automated-decisioning workflow satisfies tuning criteria, the system implementing method 200 may aggregate the digital events that were dispatched to the probationary automated-decisioning workflow in S220 and the corresponding chargeback digital events (if applicable) to compute an inflection threshold value for one or more of the properties/attributes in the dispatched digital events. It shall also be noted that, in some embodiments, the method 200 may function to compute an inflection threshold value for one or more of the properties/attributes (e.g., digital event features) based on a digital event corpus associated with a subscriber. In such embodiments, these one or more inflection threshold values may inform the method 200 in setting route conditions for a probationary automated decisioning workflow in analogous ways described in S210. Computing an inflection threshold value for a property/attribute defined in the one or more dispatched digital events optionally includes determining a threshold value of that property/attribute, such that (1) at least a first amount (e.g., 60%, 70%, 80%, 90%, or 95%, etc.) of the dispatched digital events that resulted in a chargeback digital event satisfy the determined threshold value of that property/attribute and (2) at least a second amount (e.g., 75%, 80%, 85%, 90%, or 95%, etc.) of the dispatched digital events that did not result in a chargeback digital event do not satisfy the determined threshold value of that property/attribute.

For example, the system implementing method 200 may determine that the inflection threshold value of a first property/attribute (e.g., distance between shipping and billing address) defined in the dispatched digital events is a first value (e.g., 400 miles). That is, at least the first amount (e.g., 60%, 70%, 80%, 90%, or 95%) of the dispatched digital events that resulted in a chargeback had a distance between the shipping and the billing address greater than the first value (e.g., 400 miles) while at least the second amount (e.g., 75%, 80%, 85%, 90%, 95%) of the dispatched digital events that did not result in a chargeback had a distance between the shipping and billing address less than the first value (e.g., 400 miles). It should be understood that inflection threshold values for other properties or attributes defined in dispatched digital events could be similarly computed in analogous ways. It should also be understood that, in some cases, the system implementing method 200 cannot compute an inflection threshold value for one or more properties/attributes defined in the dispatched digital events (e.g., if such an inflection threshold value does not exist).

In some embodiments, the inflection threshold value may be derived based on deriving a feature distribution graph for each feature defined in a digital event corpus. Thus, in such embodiments, automatically deriving the plurality of distinct digital event decisioning criteria may include constructing, via the one or more computers, a distinct feature distribution graph for each of the plurality of distinct digital event features and automatically assessing, via the one or more computers, the distinct feature distribution graph constructed for each of the plurality of distinct digital event features.

In some embodiments, the distinct feature distribution graph constructed for each of the plurality of distinct digital event features comprises a plurality of distinct axes, including a feature value axis, a feature frequency axis, and a digital threat score axis. Thus, in some embodiments, constructing the distinct feature distribution graph for each of the plurality of digital event features may include plotting, via the one or more computers, a plurality of distinct graphical points on the distinct feature distribution graph. In some embodiments, each of the plurality of distinct graphical points relates to a distinct digital event data sample underlying the digital event data corpus; and each of the plurality of distinct graphical points is plotted based on a value of the target distinct digital event feature for the distinct digital event data sample, a computed frequency of the value of the target digital event feature in the digital event data corpus, and a digital threat score value computed for the distinct digital event data sample.

In some embodiments, automatically deriving the plurality of distinct digital event decisioning criteria based on the distinct feature distribution graph includes automatically deriving, via the one or computers, a first distinct feature value range of the distinct target digital event feature that relates to at least a threshold amount of the plurality of digital event samples that are associated with the digital chargeback event, and automatically deriving, via the one or computers, a second distinct feature value range of the distinct target digital event feature that relates to at least a threshold amount of the plurality of digital event samples that are not associated with the digital chargeback event.

In some embodiments, the plurality of distinct automated digital event decisioning routes defined in the probationary automated fraud or abuse detection workflow include a first distinct automated digital event decisioning route that prevents a subject digital event from being processed to completion, a second distinct automated digital event decisioning route that enables a subject digital event to be processed to completion, and a third distinct automated digital event decisioning route that routes the subject digital event to a review queue associated with the target subscriber. In some embodiments, setting the distinct route execution condition of the first distinct automated digital event decisioning route includes defining a Boolean expression that evaluates if the distinct target digital event feature of the subject digital event has a value within the first distinct feature value range. Additionally, or alternatively, in some embodiments, setting the distinct route execution condition of the second distinct automated digital event decisioning route includes defining a Boolean expression that evaluates if the value of the distinct target digital event feature exists within the second distinct feature value range. Furthermore, in some embodiments, setting the distinct route execution condition of the third distinct automated digital event decisioning route includes defining a Boolean expression that evaluates if the value of the distinct target digital event feature exists between the first and the second distinct feature value range.

In some embodiments, in response to the system-implementing method 200 determining that the probationary automated-decisioning workflow does not satisfy predetermined performance criteria, the system implementing method 200 adds to one or more route conditions defined in the probationary automated-decisioning workflow one or more criteria that is based on (e.g., derived from) the above-described computed inflection threshold values. For example, with continued reference to the example described above, in response to the system implementing method 200 determining that the probationary automated-decisioning workflow does not satisfy predetermined performance criteria (e.g., because the computed "missed fraud rate" of the probationary automated-decisioning workflow during simulation was higher than the subscriber-determined or subscriber-determined target "missed fraud rate") and determining that the inflection threshold value of a first property/attribute (e.g., distance between shipping and billing address) defined in the dispatched digital events is the first value (e.g., 400 miles), the system implementing method 200 optionally tunes one of the route conditions related to the automated-decisioning routes in the probationary automated-decisioning workflow that are directed to allowing a digital event to be executed to completion (e.g., allowed) to include a new criterion (e.g., Boolean expression) that requires the distance between the shipping address and the billing address of a corresponding digital event to be less than the first value (e.g., 400 miles). Thus, optionally preventing the probationary automated-decisioning workflow from processing to completion digital events that are potentially fraudulent (e.g., digital events that have a distance between shipping address and billing address greater than the first value (e.g., 400 miles)—because, in the example described above, the first amount (e.g., 60%, 70%, 80%, 90%, or 95%) of the dispatched digital events that resulted in a chargeback had a distance between shipping and billing address greater than the first value (e.g., 400 miles)).

In some embodiments, in response to the system implementing method 200 determining that the probationary automated-decisioning workflow does not satisfy predetermined performance criteria, the system implementing method 200 optionally removes one or more criteria from one or more route conditions defined in the probationary automated-decisioning workflow (e.g., such as existing/user-added route criteria that is contrary to the computed inflection threshold values). For example, if the system implementing method 200 determines that, during simulation, the probationary automated-decisioning workflow has a "missed fraud rate" that is higher than a predetermined "missed fraud rate", the system implementing method 200 may remove erroneous criteria defined in a route condition that may be causing the probationary automated-decisioning workflow to process potentially fraudulent transactions to completion. That is, with reference to the above-described examples, if the route condition of an automated-decisioning route directed to allowing digital events to be processed to completion include a criterion requiring that the shipping address and billing address of the digital event be greater than at least the first value (e.g., 400 miles), the system implementing method 200 may, in this example, remove that erroneous criterion because, as described above, the first amount (e.g., 60%, 70%, 80%, 90%, or 95%) of the dispatched digital events that resulted in a chargeback had a distance between shipping and billing address greater than the first value (e.g., 400 miles). It shall be noted that one or more of the techniques described herein may additionally or alternatively be used by S210 to create or build an automated-decisioning workflow.

Additionally, or alternatively, to the examples described above, in some embodiments, in response to the system implementing method 200 determining that the probationary automated-decisioning workflow does not satisfy predetermined performance criteria, the system implementing method 200 optionally tunes existing route conditions. For example, if the route condition of an automated-decisioning route that is directed to allowing digital events to be executed to completion includes a criterion that requires the digital event to have a computed threat score less than a first value (e.g., 0.5), the system implementing method 200 may, in response to determining that the "missed fraud rate" of the probationary automated-decisioning workflow during simulation was higher than the subscriber-determined or subscriber-determined target "missed fraud rate", optionally modify the criterion to require that the digital event have a computed threat score less than a second value (e.g., 0.3). Thus, optionally preventing the probationary automated-decisioning workflow from processing to completion digital events that are potentially fraudulent by allowing "safer" digital events to executed to completion (e.g., digital events that have a computed threat score of 0.3) while preventing more "riskier" digital events (e.g., digital events that have a computed threat score greater than 0.3).

Automatically Re-Tuning an Incumbent Automated-Decisioning Workflow

As described previously, in some embodiments, S240 may function to automatically re-tune an incumbent automated-decisioning workflow in response to determining that the incumbent automated-decisioning workflow does not satisfy simulation performance criteria. In such embodiments, S240 may function to automatically re-tune the incumbent automated-decisioning workflow in one or more similar ways described previously with respect to automatically re-tuning the probationary automated-decisioning workflow, which will not be repeated for the sake of brevity.

2.50 Deploying a Succeeding Automated-Decisioning Workflow

S250, which includes deploying a succeeding automated-decisioning workflow, may function to convert a tuned probationary automated-decisioning workflow or a tuned incumbent automated-decisioning workflow to a live automated-decisioning workflow in response to determining that the tuned probationary automated-decisioning workflow or the tuned incumbent automated-decisioning satisfy simulation performance criteria. In one or more embodiments, converting a tuned incumbent automated-decisioning workflow to a live automated-decisioning workflow may include replacing (e.g., un-deploying) the live/current version of the incumbent automated-decisioning workflow in a digital threat mitigation platform with the tuned incumbent automated-decisioning workflow (e.g., the succeeding automated-decisioning workflow).

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A machine learning-based method for accelerating a generation of automated fraud or abuse detection workflows in a digital threat mitigation platform:
   identifying a plurality of distinct digital event features indicative of digital fraud or digital abuse based on an assessment of a digital event data corpus associated with a target subscriber;
   automatically deriving a plurality of distinct digital event decisioning criteria based on the plurality of distinct digital event features and the digital event data corpus, wherein automatically deriving the plurality of distinct digital event decisioning criteria includes:
   (1) training, via one or more computers, a digital event meta machine learning model comprising a tree classifier using labeled training data samples of the digital event data corpus, wherein the labeled training data samples include a subset of training data samples having one or more of a digital fraud label and a digital abuse label,
   wherein the tree classifier, once trained, computes a likelihood that a target digital event is either a digital fraud event or a digital abuse event;
   (2) based on the training of the tree classifier, exposing a classification structure including a plurality of digital event classification paths of the tree classifier, wherein the classification structure includes learned conditions and/or criteria applied by the tree classifier for classifying the target digital event to a distinct digital threat class of a plurality of distinct digital threat classes;
   (3) extracting, via the one or more computers, from the classification structure of the tree classifier the plurality of distinct digital event decisioning criteria comprising one or more distinct digital event decisioning criteria and/or one or more distinct digital event decisioning conditions for configuring digital fraud detection logic or digital abuse detection logic of a target automated digital fraud or digital abuse detection workflow;
   automatically constructing, via the one or more computers, a probationary automated fraud or abuse detection workflow based on the plurality of distinct digital event decisioning criteria, wherein automatically constructing the probationary automated fraud or abuse detection workflow includes:
   (a) defining a plurality of distinct automated digital event decisioning routes in the probationary automated fraud or abuse detection workflow, and
   (b) setting a distinct route execution condition for each of the plurality of distinct automated digital event decisioning routes based on the plurality of distinct digital event decisioning criteria; and
   deploying the probationary automated fraud or abuse detection workflow to a target digital fraud prevention environment of the target subscriber based on identifying efficacy metrics computed for the automated fraud or abuse detection workflow satisfy pre-determined workflow performance criteria.

2. The machine learning-based method according to claim 1, wherein:
   each of the plurality of distinct automated digital event decisioning routes defined in the probationary automated fraud or abuse detection workflow relates to a distinct digital event classification path underlying the trained digital event meta machine learning model, and
   the distinct route execution condition for each of the plurality of distinct automated digital event decisioning routes comprises the one or more distinct digital event decisioning criterion extracted from the distinct digital event classification path related to each of the plurality of distinct automated digital event decisioning routes.

3. The machine learning-based method according to claim 1, wherein:
   the digital event data corpus used for training the digital event meta machine learning model comprises a plurality of distinct digital event meta-training data samples, and
   each of the plurality of distinct digital event meta-training data samples:
   (i) corresponds to a distinct digital event associated with the target subscriber;
   (ii) comprises a digital threat score of the distinct digital event, wherein the digital threat score is computed by an ensemble of production-implemented digital threat scoring machine learning models;
   (iii) comprises a distinct feature value of each of the plurality of digital event features, wherein the distinct feature value is extracted from the distinct digital event via one or more feature extractor algorithms; and
   (iv) defines a chargeback label indicating if the distinct digital event relates to a chargeback event.

4. The machine learning-based method according to claim 1, wherein:
   the plurality of distinct digital event classification paths include:
   (a) one or more first distinct digital event classification paths that are configured to classify a subject digital event as likely relating to a digital fraud event; and
   (b) one or more second distinct digital event classification paths that are configured to classify the subject digital event as likely relating to genuine digital activity, and
   the plurality of distinct automated digital event decisioning routes defined in the probationary automated fraud or abuse detection workflow include:
   (c) one or more first distinct automated digital event decisioning routes corresponding to the one or more first distinct digital event classification paths, wherein the one or more first distinct automated digital event decisioning routes enable a target digital event to be processed to completion; and
   (d) one or more second distinct automated digital event decisioning routes corresponding to the one or more second distinct digital event classification paths, wherein the one or more second distinct automated digital event decisioning routes prevent a target digital event from being processed to completion.

5. The machine learning-based method according to claim 4, wherein:
  each of the plurality of distinct digital event classification paths of the digital event meta machine learning model comprises one or more distinct digital event decisioning criterion,
  each of the one or more distinct digital event decisioning criterion relates to a Boolean expression that assess a distinct digital event feature of the plurality of distinct digital event features against a numerical or categorical digital event feature value computed by the digital event meta machine learning model,
  each distinct automated digital event decisioning route of the one or more first distinct automated digital event decisioning routes relates to a distinct digital event classification path of the one or more first distinct digital event classification paths, and
  setting the distinct route execution condition for each distinct automated digital event decisioning route of one or more first distinct automated digital event decisioning routes includes:
    (i) extracting each distinct digital event decisioning criterion defined in a distinct digital event classification path relating to a distinct automated digital event decisioning route of the one or more first distinct automated digital event decisioning routes; and
    (ii) adding the each distinct digital event decisioning criterion extracted from the distinct digital event classification path to the distinct route execution condition of the distinct automated digital event decisioning route relating to the distinct digital event classification path.

6. The machine learning-based method according to claim 5, wherein:
  the plurality of distinct digital event features include a digital threat score feature,
  the digital threat score feature indicates a likeliness of the subject digital event relating to digital fraud on a scale from 0 to 100; and
  at least one of the each distinct digital event decisioning criterion relates to a Boolean expression that assesses the digital threat score feature of the subject digital event against a predetermined digital threat score value computed by the digital event meta machine learning model.

7. The machine learning-based method according to claim 5, wherein:
  each distinct automated digital event decisioning route of the one or more second distinct automated digital event decisioning routes relates to a distinct digital event classification path of the one or more second distinct digital event classification paths, and
  setting the distinct route execution condition for each distinct automated digital event decisioning route of one or more second automated digital event decisioning routes includes:
    (i) extracting each distinct digital event decisioning criterion defined in the distinct digital event classification path relating to a distinct automated digital event decisioning route of the one or more second automated digital event decisioning routes; and
    (ii) adding the each distinct digital event decisioning criterion extracted from the distinct digital event classification path to the distinct route execution condition of the distinct automated digital event decisioning route.

8. The machine learning-based method according to claim 1, wherein:
  the plurality of distinct digital event decisioning criteria are derived from one or more feature distribution graphs, and
  automatically deriving the plurality of distinct digital event decisioning criteria includes:
    (1) constructing a distinct feature distribution graph for each of the plurality of distinct digital event features; and
    (2) automatically assessing the distinct feature distribution graph constructed for each of the plurality of distinct digital event features.

9. The machine learning-based method according to claim 8, wherein:
  the distinct feature distribution graph constructed for each of the plurality of distinct digital event features comprises a plurality of distinct axes, including a feature value axis, a feature frequency axis, and a digital threat score axis;
  each of the distinct feature distribution graphs corresponds to a target distinct digital event feature of the plurality of digital event features; and
  constructing the distinct feature distribution graph for each of the plurality of digital event features includes:
    plotting a plurality of distinct graphical points on the distinct feature distribution graph, wherein:
      (a) each of the plurality of distinct graphical points relates to a distinct digital event data sample underlying the digital event data corpus; and
      (b) each of the plurality of distinct graphical points is plotted based on (i) a value of the target distinct digital event feature for the distinct digital event data sample, (ii) a computed frequency of the value of the target digital event feature in the digital event data corpus, and (iii) a digital threat score value computed for the distinct digital event data sample.

10. The machine learning-based method according to claim 8, wherein:
  the digital event data corpus comprises a plurality of distinct digital event data samples,
  the plurality of distinct digital event data samples underlying the digital event data corpus include:
    (a) a plurality of digital event samples that are associated with a digital chargeback event, and
    (b) a plurality of digital event samples that are not associated with a digital chargeback event;
  each of the distinct feature distribution graphs relates to a distinct target digital event feature of the plurality of digital event features; and
  automatically deriving the plurality of distinct digital event decisioning criteria based on the distinct feature distribution graph includes:
    (1) automatically deriving, via the one or computers, a first distinct feature value range of the distinct target digital event feature that relates to at least a threshold amount of the plurality of digital event samples that are associated with the digital chargeback event, and
    (2) automatically deriving, via the one or computers, a second distinct feature value range of the distinct target digital event feature that relates to at least a threshold amount of the plurality of digital event samples that are not associated with the digital chargeback event.

11. The machine learning-based method according to claim 10, wherein:

the plurality of distinct automated digital event decisioning routes defined in the probationary automated fraud or abuse detection workflow include:
(1) a first distinct automated digital event decisioning route that prevents a subject digital event from being processed to completion;
(2) a second distinct automated digital event decisioning route that enables a subject digital event to be processed to completion; and
(3) a third distinct automated digital event decisioning route that routes the subject digital event to a review queue associated with the target subscriber, setting the distinct route execution condition of the first distinct automated digital event decisioning route includes defining a Boolean expression that evaluates if the distinct target digital event feature of the subject digital event has a value within the first distinct feature value range, setting the distinct route execution condition of the second distinct automated digital event decisioning route includes defining a Boolean expression that evaluates if the value of the distinct target digital event feature exists within the second distinct feature value range, and setting the distinct route execution condition of the third distinct automated digital event decisioning route includes defining a Boolean expression that evaluates if the value of the distinct target digital event feature exists between the first and the second distinct feature value range.

12. The machine learning-based method according to claim 1 further comprising:
simulating, via the one or computers, the probationary automated fraud or abuse detection workflow based on a corpus of historical digital events associated with the target subscriber;
computing one or more efficacy metrics for the probationary automated fraud or abuse detection workflow based on the simulation;
identifying that the probationary automated fraud or abuse detection workflow does not satisfy the pre-determined workflow performance criteria; and
iteratively tuning the probationary automated fraud or abuse detection workflow until the probationary automated fraud or abuse detection workflow satisfies the pre-determined workflow performance criteria.

13. The machine learning-based method according to claim 12, wherein:
the distinct route execution condition for each of the plurality of distinct automated digital event decisioning routes comprises a subset of the plurality of distinct digital event decisioning criterion defined in a distinct digital event classification path related to each of the plurality of distinct automated digital event decisioning routes,
iteratively tuning the automated fraud or abuse detection workflow includes iteratively tuning the distinct route execution condition for each of the plurality of automated digital event decisioning routes, and
iteratively tuning the route execution condition of a subject automated digital event decisioning route includes:
identifying a distinct digital event decisioning criterion that is included in the distinct digital event classification path related to the subject automated digital event decisioning route and not included in the distinct route execution condition of the subject automated digital event decisioning route; and
adding the distinct digital event decisioning criterion to the distinct route execution condition of the subject automated digital event decisioning route.

14. The machine learning-based method according to claim 13, wherein the identifying the distinct digital event decisioning criterion and the adding the distinct digital event decisioning criterion are iteratively performed until the probationary automated fraud or abuse detection workflow satisfies the pre-determined workflow performance criteria.

15. The machine learning-based method according to claim 13, wherein:
the distinct route execution condition automatically set for each of the plurality of distinct automated digital event decisioning routes in the automated fraud or abuse detection workflow includes a first number of distinct digital event decisioning criteria, and
iteratively tuning the automated fraud or abuse detection workflow causes the distinct route execution condition for each of the plurality of distinct automated digital event decisioning routes to comprise a second number of distinct digital event decisioning criteria, greater than the first number of distinct digital event decisioning criteria.

16. The machine learning-based method according to claim 1, wherein:
the target subscriber has previously deployed an incumbent automated fraud or abuse detection workflow to the digital threat mitigation platform,
the probationary automated fraud or abuse detection workflow is automatically constructed for the target subscriber based on the digital threat mitigation platform identifying that the incumbent automated fraud or abuse detection workflow does not satisfy pre-determined workflow performance criteria, and
deploying the probationary automated fraud or abuse detection workflow to the target digital fraud prevention environment includes:
replacing, via the one or computers, the incumbent automated fraud or abuse detection workflow with the probationary automated fraud or abuse detection workflow.

17. The machine learning-based method according to claim 1, wherein:
the target subscriber satisfies new subscriber criteria of the digital threat mitigation platform, and
the probationary automated fraud or abuse detection workflow is automatically constructed for the target subscriber based on the digital threat mitigation platform identifying that the target subscriber has deployed or created less than a threshold number of automated fraud or abuse detection workflows.

18. A computer-program product embodied in a non-transitory machine-readable storage medium storing computer instructions that, when executed by one or more processors, perform operations comprising:
identifying, via the one or more processors, a plurality of distinct digital event features indicative of digital fraud based on an assessment of a digital event data corpus associated with a target subscriber;
automatically deriving, via the one or more processors, a plurality of distinct digital event decisioning criteria based on the plurality of distinct digital event features and the digital event data corpus, wherein automatically deriving the plurality of distinct digital event decisioning criteria includes:

(1) training a digital event meta machine learning model comprising a tree classifier using labeled training data samples of the digital event data corpus, wherein the labeled training data samples include a subset of training data samples having one or more of a digital fraud label and a digital abuse label, wherein the tree classifier, once trained, computes a likelihood that a target digital event is either a digital fraud event or a digital abuse event;

(2) based on the training of the tree classifier, exposing a classification structure including a plurality of digital event classification paths of the tree classifier, wherein the classification structure includes learned conditions and/or criteria applied by the tree classifier for classifying the target digital event to a distinct digital threat class of a plurality of distinct digital threat classes;

(3) extracting from the classification structure of the tree classifier the plurality of distinct digital event decisioning criteria comprising one or more distinct digital event decisioning criteria and/or one or more distinct digital event decisioning conditions for configuring digital fraud detection logic or digital abuse detection logic of a target automated digital fraud or digital abuse detection workflow;

automatically constructing, via the one or more processors, a probationary automated fraud or abuse detection workflow based on the plurality of distinct digital event decisioning criteria, wherein automatically constructing the probationary automated fraud or abuse detection workflow includes:

(a) defining, via the one or more processors, a plurality of distinct automated digital event decisioning routes in the probationary automated fraud or abuse detection workflow, and (b) setting, via the one or more processors, a distinct route execution condition for each of the plurality of distinct automated digital event decisioning routes based on the plurality of distinct digital event decisioning criteria; and deploying, via the one or more processors, the probationary automated fraud or abuse detection workflow to a target digital fraud prevention environment of the target subscriber based on identifying efficacy metrics computed for the automated fraud or abuse detection workflow satisfy pre-determined workflow performance criteria.

19. A computer-implemented system comprising:
one or more processors;
a memory;
a computer-readable medium operably coupled to the one or more processors, the computer-readable medium having computer-readable instructions stored thereon that, when executed by the one or more processors, cause the computing device to perform operations comprising:

identifying, via the one or more processors, a plurality of distinct digital event features indicative of digital fraud based on an assessment of a digital event data corpus associated with a target subscriber;

automatically deriving, via the one or more processors, a plurality of distinct digital event decisioning criteria based on the plurality of distinct digital event features and the digital event data corpus, wherein automatically deriving the plurality of distinct digital event decisioning criteria includes:

(1) training a digital event meta machine learning model comprising a tree classifier using labeled training data samples of the digital event data corpus, wherein the labeled training data samples include a subset of training data samples having one or more of a digital fraud label and a digital abuse label, wherein the tree classifier, once trained, computes a likelihood that a target digital event is either a digital fraud event or a digital abuse event;

(2) based on the training of the tree classifier, exposing a classification structure including a plurality of digital event classification paths of the tree classifier, wherein the classification structure includes learned conditions and/or criteria applied by the tree classifier for classifying the target digital event to a distinct digital threat class of a plurality of distinct digital threat classes;

(3) extracting from the classification structure of the tree classifier the plurality of distinct digital event decisioning criteria comprising one or more distinct digital event decisioning criteria and/or one or more distinct digital event decisioning conditions for configuring digital fraud detection logic or digital abuse detection logic of a target automated digital fraud or digital abuse detection workflow;

automatically constructing, via the one or more processors, a probationary automated fraud or abuse detection workflow based on the plurality of distinct digital event decisioning criteria, wherein automatically constructing the probationary automated fraud or abuse detection workflow includes:

(a) defining, via the one or more processors, a plurality of distinct automated digital event decisioning routes in the probationary automated fraud or abuse detection workflow, and (b) setting, via the one or more processors, a distinct route execution condition for each of the plurality of distinct automated digital event decisioning routes based on the plurality of distinct digital event decisioning criteria; and deploying, via the one or more processors, the probationary automated fraud or abuse detection workflow to a target digital fraud prevention environment of the target subscriber based on identifying efficacy metrics computed for the automated fraud or abuse detection workflow satisfy pre-determined workflow performance criteria.

\* \* \* \* \*